Nov. 17, 1959  A. H. EVERTS  2,913,382
METHOD FOR PRODUCING METALS ELECTROLYTICALLY
Filed Jan. 28, 1957
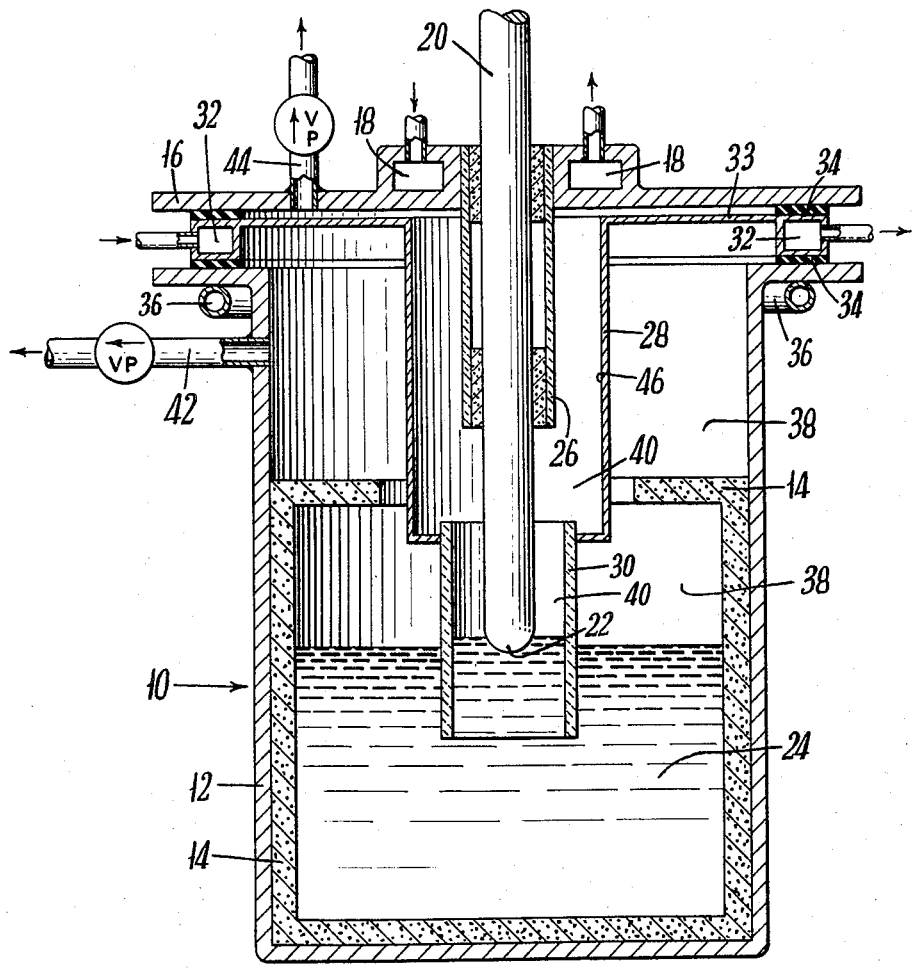
INVENTOR.
ARTHUR H. EVERTS
BY
ATTORNEY

2,913,382
METHOD FOR PRODUCING METALS ELECTROLYTICALLY

Arthur H. Everts, Niagara Falls, N.Y., assignor to Union Carbide Corporation, a corporation of New York Application January 28, 1957, Serial No. 636,805

2 Claims. (Cl. 204—69)

This invention relates to the production of metals. More particularly, this invention relates to a method and an apparatus for producing alkaline earth metals from the corresponding metal fluorides and chlorides by electrolysis in a fused bath.

Alkali metals and alkaline earth metals are often difficult to produce in a pure state. The difficulties encountered in the production of calcium illustrate the difficulties encountered in the production of the other metals.

Calcium is a useful material in a variety of applications. By way of illustration, calcium may be used as a scavenger for oxygen in the production of stainless steel, as a starting material in the production of calcium hydride which is a convenient source of hydrogen, as a component of an alloy with lead from which coverings for electric cables can be formed, as a hardener for battery plates in lieu of the more expensive barium and as a chemical reducing agent.

Heretofore calcium has been produced by processes that have been found to have certain disadvantages. By one prior process calcium is produced thermochemically (as distinguished from electrochemically) by the reduction of calcium oxide with aluminum but this process is unattractive because of the requirement that the aluminum used be of higher purity than the grade of aluminum which it is economically practical to employ. According to another prior process, calcium is produced thermochemically by the reaction of calcium oxide and ferrosilicon. This latter process is operable at temperatures of about 1300° C. and hence difficulties arise in constructing and maintaining reactors for use in the process because of the elevated temperatures involved. In addition, both of the foregoing prior processes for producing calcium include a second step wherein the calcium is distilled from the reaction mixture at the completion of the reaction and is condensed in a separate part of the reactor in order to isolate the calcium in a pure state. Hence both of the foregoing processes suffer from the limitations of two step processes as compared to one step processes, e.g. longer process times.

Still another prior process provides for the production of calcium electrolytically by the electrolysis of calcium chloride in a fused bath. Impurities are present in the calcium chloride that it is commercially feasible to use in this prior electrolytic process. Among these impurities are 0.4% by weight sodium, 0.2% by weight iron and 0.1% by weight boron. The cathodic products produced from the impurities present in the impure calcium chloride as well as the calcium chloride electrolyte itself contaminate the calcium deposited at the cathode making it too impure for some uses, e.g. for use as a chemical reducing agent in producing high purity refractive metals.

It is, accordingly, an object of the present invention to provide a method and an apparatus for producing highly pure alkaline earth metals by a fused bath electrolytic process from the impure fluorides and chlorides of these metals.

A further object of this invention is to provide a single step fused bath electrolytic process for producing high purity alkaline earth metals from impure fluorides and chlorides of these metals.

Another object of this invention is to provide a method and an apparatus or cell for producing alkaline earth metals electrolytically at sub-atmospheric pressures and at temperatures such that the apparatus used may be constructed of readily available materials.

In accordance with the present invention, a fluoride or a chloride of an alkaline earth metal is charged into an electrolytic cell having an anode, a cathode and a compartment separating member which divides the space inside the cell above the normal electrolyte level into two compartments, namely an anode compartment and a cathode compartment. A cooled surface that is located in or that is in communication with the cathode compartment is provided in the upper portion of the cell. Sub-atmospheric pressures are maintained in the anode and cathode compartments and the electrolyte is fused to produce a fused bath by heating it to a temperature at which the metal to be produced boils at the sub-atmospheric pressure maintained in the cathode compartment. Upon electrolysis, fluorine or chlorine is produced at the anode and an alkaline earth metal is produced at the cathode and is evolved at the cathode as a vapor. The evolved metal vapor condenses and solidifies in a pure state on the cooled surface that is located in or that communicates with the cathode compartment.

The cell shown in the drawing, represents one embodiment of this invention. The drawing is a vertical cross-sectional view of the cell.

As shown in the drawing, the cell 10 of the present invention comprises a cylindrical outer shell 12 of steel or other suitable material, an internal lining 14 of graphite or the like that serves as an anode, and a cover 16 of steel or other suitable material. Through the cover 16 pass channels 18 for cooling fluid and the cover 16 is provided with an opening through which passes a cylindrical tube electrode 20 of steel or other suitable material that serves as the cathode. The tube electrode 20 has a tapered tip 22 of stainless steel or other suitable material that is immersed in the electrolyte 24. The cathode 20 is supported and positioned substantially in the center of the cell 10 by a cylindrical sleeve 26 which is surrounded by a coaxial compartment separating member 28 of steel or other suitable material that provides a cathodic wall surface 46 on which the metal vapor produced at the cathode 20 may condense and solidify.

The compartment separating member 28 is attached to and supports an annular skirt 30 of aluminum oxide or other suitable material that is porous to the metal and halide ions in the electrolyte 24, that can withstand the temperatures used in the process of this invention and that is electrically non-conducting. Annular skirt 30 extends under the surface of the electrolyte 24 to provide separated anode and cathode compartments but does not extend so far below the surface of the electrolyte 24 as to come into contact with the anode 14. The compartment separating member 28 is provided with a flange 33 at its upper end. Annular channel 32 for cooling fluid passes through flange 33. The cover 16 and the outer shell 12 are separated from flange 33 by gaskets 34 of rubber or other suitable thermally insulating material. The flange 33 provides thermal contact between both the cathodic wall surface 46 of the compartment separating member 28 and the gaskets 34 and the cooling fluid in annular channel 32. Below the gaskets 34 passes an annular external cooling conduit 36 which permits circulation of fluid for further cooling the gaskets 34.

The compartment separating member 28 and the skirt 30 divide the interior space of the cell 10 above the electrolyte 24 into two compartments, i.e. an anode compartment 38 formed between the anode 14 and the outer shell 12 on the outer side and the separating member 28 and the skirt 30 on the inner side and a cathode compartment 40 enclosed by the separating member 28 and the skirt 30.

The anode 14 communicates with the cathode 20 through the portion of the electrolyte 24 that is below the skirt 30. Compartment 38 communicates with a vacuum pump through conduit 42 which passes through an opening in shell 12, and compartment 40 communicates with a vacuum pump through conduit 44 which passes through an opening in cover 16.

In operating the above-described cell according to the method of the instant invention an electrolyte 24 containing a fluoride or chloride of an alkaline earth metal that is to be electrolyzed is charged into the cell. In addition to the chloride or fluoride of an alkaline earth metal that is to be electrolyzed, the electrolyte 24 may contain other components, such as components which serve to increase the fluidity and/or lower the melting point of the electrolyte. By way of illustration, when calcium metal is being produced from calcium chloride, a eutectic mixture containing 81 parts by weight of calcium chloride and 19 parts by weight of calcium fluoride per 100 parts by weight of the eutectic mixture is useful as an electrolyte since the calcium fluoride lowers the melting point of the electrolyte and increases the fluidity of the fused bath. In the latter illustration, the calcium fluoride is not electrolyzed as long as calcium chloride is present in the fused bath.

After the addition of the electrolyte 24, subatmospheric pressures are produced in both compartments 38 and 40 of the cell 10 by means of the vacuum pumps that communicate with the compartments 38 and 40 through conduits 42 and 44. The electrolyte 24 is thereupon heated to the temperature at which the electrolyte 24 is fused and at which the metal that is to be produced boils at the subatmospheric pressure that exists in the cathode compartment 40.

By way of illustration, when calcium is being produced from calcium chloride by the process of this invention employing the above-described eutectic mixture as an electrolyte, the pressure may be reduced to about 1.0 mm. of Hg in both compartments 38 and 40 and the electrolyte 24 may be fused by heating to a temperature between about 850° C. to 950° C. which is the approximate boiling point range of calcium at pressures near 1.0 mm. of Hg.

The electrolyte 24 may be heated by any suitable means, such as by the application of heat to the bottom of shell 12. The electrolyte 24 may be maintained at the elevated temperature for a short time (e.g. about 15 minutes) before the electrolysis is begun to insure that any water vapor present in the cell 10 is vaporized and removed by the vacuum pumps that communicate with compartments 38 and 40. The cooling fluid in annular cooling conduit 36 and the cooling fluid in channel 32 prevent the deterioration of the gaskets 34 at the elevated temperatures used in the process of the invention.

A cell voltage is then applied across the cell 10 and the electrolysis reaction occurs while the temperature and sub-atmospheric pressure conditions are maintained. The electrolysis reaction may be represented by the equation:

$$MX_n \longrightarrow M + \frac{n}{2}X_2$$

wherein M is an alkaline earth metal, ($n$) is the valence of the metal and X is a fluorine or a chlorine atom. Gaseous fluorine or chlorine is evolved at the anode 14 during electrolysis and is withdrawn from the anode compartment 38 by a vacuum pump which communicates with the anode compartment 38 through conduit 42. This pump should be of large capacity, in relation to the pump used to maintain the sub-atmospheric pressure in the cathode compartment 40, in order to be adequate to remove the gaseous fluorine or chlorine.

The alkaline earth metal that is produced at the cathode 20 during the electrolysis in the process of this invention is vaporized along with small amounts of the cathodic products produced from the electrolysis of the impurities present in the electrolyte 24. The metal is condensed and cooled to the solid state on the cathodic wall surface 46 of the compartment separating member 28. The cathodic wall surface 46 is maintained at a temperature lower than the melting point of the metal being produced by thermal contact with the cooling fluid in channel 32. Due to their differences in boiling and melting points, the desired metal product and the other cathodic products condense and solidify in separate space zones on the cathodic wall surface 46 of compartment separating member 28. Hence the metal produced in the process of this invention is pure, e.g., calcium of from 98% to 99.5% by weight purity may be produced by this invention. The continuous separation of the metal from the bath as it is produced was found to minimize loss of the metal due to the metal dissolving in the bath.

The alkaline earth metal vapor that is evolved at the cathode 20 is prevented from recombining with the gaseous fluorine or chlorine that is produced at the anode 14 by the provision of the compartment separating member 28 and the skirt 30 which form a partition separating the spaces above electrolyte 24 near the electrodes 14 and 20.

At the completion of the electrolysis, the cell 10 is disassembled and the metal product may be readily stripped from the cathodic wall surface 46 of compartment separating member 28.

The following is a tabulation of experimental data obtained during the operation of a cell embodying the present invention when used to produce pure calcium from impure calcium chloride:

| | |
|---|---|
| Anode (crucible): | |
|   Composition | Graphite. |
|   Dimensions | 9 in. deep, 9 in. I.D. |
| Cathode: | |
|   Dimensions | 1 in. (standard steel pipe). |
|   Composition— | |
|     Pipe | Steel. |
|     Tipped with | Stainless steel. |
| Current density: | |
|   Anode | 9 amps./sq. in. |
|   Cathode | 115 amps./sq. in. |
| Electrolyte: eutectic mixture | 32 lbs. containing $CaCl_2$ 81% by wt.; $CaF_2$ 19% by wt. |
| Duration of electrolysis | 40 minutes. |
| Grams of Ca produced | 9.5. |
| Purity of Ca produced | 99.5% by wt. (calculated by hydrogen evolution). |
| Current efficiency | 22%. |
| Temperature | 860° C. to 920° C. |
| Pressure in anode compartment: | |
|   Start | 1.1 mm. of Hg. |
|   Finish | 0.5 mm. of Hg. |
| Pressure in cathode compartment: | |
|   Start | 0.8 mm. of Hg. |
|   Finish | 0.7 mm. of Hg. |
| Cell voltage | 11.2 volts. |

The embodiment of the cell of this invention described in detail above may be modified in various ways without departing from the scope of the invention. By way of illustration, the alkaline earth metal vapor evolved at the cathode may be led through a conduit that communicates with the cathode compartment to a cooled surface that is outside the shell and condensed and solidified on the cooled surface. As a further illustration, the anode may be in any of a variety of shapes such as in the shape of a block or a rod.

The metals that may be produced by this invention are the alkaline earth metals (i.e. calcium, strontium, barium and magnesium). These metals boil below 1000° C. at sub-atmospheric pressures, form fluorides or chlorides which melt below 1000° C. and form fluorides or chlorides which are electrolytically conducting in the fused state. The fluorides and chlorides of these metals are useful as starting materials in the process of this invention but the chlorides of these metals are preferred. This invention is especially applicable to the production of calcium from calcium chloride.

What is claimed is:
1. A single-step electrolytic method for producing in a pure form alkaline earth metals in an electrolytic cell which comprises providing in said cell an electrolyte comprising at least one member selected from the group consisting of the chlorides and fluorides of the alkaline earth metals, separating the space in said cell above the normal electrolyte level into an anode compartment and a cathode compartment, providing in the upper portion of said cell a surface on which the metal produced and evolved at the cathode can condense and solidify, establishing sub-atmospheric pressures in said compartments, providing a fused bath by heating the electrolyte to a temperature at which the metal to be produced boils at the sub-atmospheric pressure in the cathode compartment, electrolyzing the fused bath to produce said metal at the cathode, volatilizing said metal produced at the cathode and condensing and solidifying the volatilized metal on said surface.

2. A single-step electrolytic method for producing calcium in a pure form in an electrolytic cell, which comprises providing in said cell an electrolyte comprising calcium chloride, separating the space in said cell above the normal electrolyte level into an anode compartment and a cathode compartment, providing in the upper portion of said cell a surface on which the calcium produced and evolved at the cathode can condense and solidify, establishing sub-atmospheric pressures in said compartments, providing a fused bath by heating the electrolyte to a temperature at which the calcium boils at the sub-atmospheric pressure in the cathode compartment, electrolyzing said fused bath to produce calcium at the cathode, volatilizing the calcium produced at the cathode and condensing and solidifying the volatilized calcium on said surface.

References Cited in the file of this patent
UNITED STATES PATENTS

| | | |
|---|---|---|
| 296,357 | Rogers | Apr. 8, 1884 |
| 623,691 | Acker | Apr. 25, 1899 |
| 1,524,268 | McNitt | Jan. 27, 1925 |
| 1,839,756 | Grebe et al. | Jan. 5, 1932 |
| 2,075,150 | Wait | Mar. 30, 1937 |
| 2,111,470 | Gadeau | Mar. 15, 1938 |

FOREIGN PATENTS

| | | |
|---|---|---|
| 13,755 | Great Britain | Sept. 25, 1851 |